(12) United States Patent
Giri et al.

(10) Patent No.: US 11,829,248 B2
(45) Date of Patent: Nov. 28, 2023

(54) FIRMWARE RECOVERY BY IMAGE TRANSFUSION

(71) Applicant: Dell Products L.P., Round Rock, TX (US)

(72) Inventors: Prashanth Giri, Round Rock, TX (US); Murali Somarouthu, Austin, TX (US); Babu Chandrasekhar, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 121 days.

(21) Appl. No.: 17/482,535

(22) Filed: Sep. 23, 2021

(65) Prior Publication Data

US 2023/0086829 A1 Mar. 23, 2023

(51) Int. Cl.
*G06F 11/14* (2006.01)
*G06F 9/445* (2018.01)
*G06F 9/4401* (2018.01)

(52) U.S. Cl.
CPC ........ *G06F 11/1417* (2013.01); *G06F 9/4401* (2013.01); *G06F 9/44505* (2013.01); *G06F 2201/86* (2013.01)

(58) Field of Classification Search
CPC .... G06F 11/14; G06F 11/1417; G06F 9/4401; G06F 2201/86
See application file for complete search history.

(56) References Cited

U.S. PATENT DOCUMENTS

| 7,024,581 B1* | 4/2006 | Wang | G06F 21/57 |
| | | | 714/38.14 |
| 10,719,310 B1 | 7/2020 | Raju et al. | |
| 2007/0169088 A1* | 7/2007 | Lambert | G06F 11/0709 |
| | | | 717/168 |
| 2012/0311279 A1* | 12/2012 | Hong | G06F 11/1461 |
| | | | 711/E12.103 |
| 2017/0034124 A1* | 2/2017 | Toda | H04L 12/1886 |
| 2017/0337513 A1* | 11/2017 | Dimino, Jr. | F42B 35/00 |
| 2018/0097839 A1* | 4/2018 | Upasani | H04L 9/0637 |
| 2019/0197003 A1 | 6/2019 | Kumar et al. | |
| 2020/0134185 A1* | 4/2020 | Cho | G06F 21/602 |
| 2020/0226028 A1* | 7/2020 | Kotary | G06F 11/2084 |
| 2021/0117272 A1* | 4/2021 | Kleppinger | G06F 11/1461 |
| 2023/0008412 A1* | 1/2023 | Brown | G06F 3/0604 |

* cited by examiner

*Primary Examiner* — Kamini B Patel
(74) *Attorney, Agent, or Firm* — Larson Newman, LLP

(57) ABSTRACT

An information handling system includes a memory and a baseboard management controller. The memory includes a recovery partition including a recovery kernel, a first boot partition including first firmware, and a second boot partition including backup firmware. The baseboard management controller (BMC) attempts a first boot operation of the first firmware in the first boot partition. In response to a failure of the first boot operation, the BMC attempts a second boot operation of the backup firmware in the second boot partition. In response to a failure of the second boot operation, the BMC operates a recovery kernel. During the operation of the recovery kernel, the BMC provides a firmware request to an enclosure controller, receives blocks of correct firmware from a functioning baseboard management controller, stores the blocks of correct firmware in the first boot partition, attempts and completes a third boot operation of the correct firmware.

18 Claims, 6 Drawing Sheets

FIRMWARE RECOVERY BY IMAGE TRANSFUSION

FIELD OF THE DISCLOSURE

The present disclosure generally relates to firmware recovery by image transfusion in an information handling system.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs and requirements can vary between different applications. Thus information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, networking systems, and mobile communication systems. Information handling systems can also implement various virtualized architectures. Data and voice communications among information handling systems may be via networks that are wired, wireless, or some combination.

SUMMARY

An information handling system includes a memory and a baseboard management controller. The memory includes a recovery partition including a recovery kernel, a first boot partition including first firmware, and a second boot partition including backup firmware. The baseboard management controller (BMC) may attempt a first boot operation of the first firmware in the first boot partition, and detect a failure of the first boot operation. In response to the detected failure of the first boot operation, the BMC may attempt a second boot operation of the backup firmware in the second boot partition, and detects a failure of the second boot operation. In response to the detected failure of the second boot operation, the BMC may operate a recovery kernel. During the operation of the recovery kernel, the BMC may provide a firmware request to an enclosure controller, receive blocks of correct firmware from a functioning baseboard management controller, store the blocks of correct firmware in the first boot partition, attempt a third boot operation of the correct firmware, and complete the third boot operation.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION OF THE DRAWINGS

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

Figure 1:
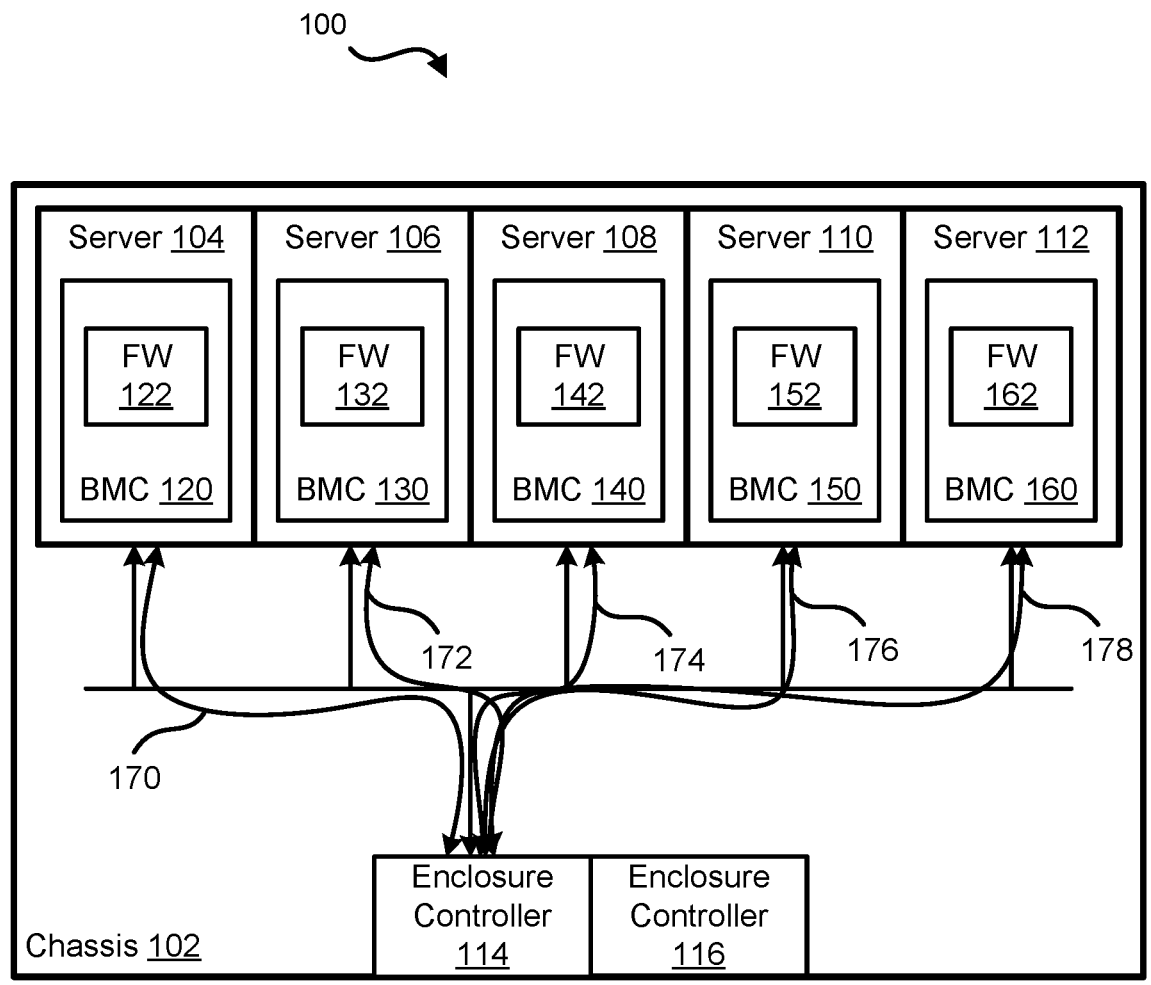
FIG. 1 is a diagram of a portion of an information handling system according to at least one embodiment of the present disclosure.

FIG. 1 illustrates a portion of an information handling system 100 according to at least one embodiment of the present disclosure. Information handling system 100 includes a chassis 102, multiple servers 104, 106, 108, 110, and 112 (104-112), and multiple enclosure controllers 114 and 116. Server 104 includes a baseboard management controller (BMC) 120, which in turn stores firmware 122 in a memory, such as memory 202 of FIG. 2. Server 106 includes a BMC 130, which in turn stores firmware 132. Server 108 includes a BMC 140, which in turn stores firmware 142. Server 110 includes a BMC 150, which in turn stores firmware 152. Server 112 includes a BMC 160, which in turn stores firmware 162. In an example, enclosure controllers 114 and 116 may be redundant enclosure controllers, such that one of the enclosure controllers may be provided as a failover device for the other enclosure controller. In this example, either of enclosure controllers 114 and 116 may communicate with servers 104-112. Information handling system 100 may include additional components without varying from the scope of this disclosure.

During operation, each of BMCs 120, 130, 140, 150, and 160 may execute a separate bootloader, which in turn may attempt to boot a respective firmware image 122, 132, 142, 152, or 162. In an example, boot operations performed by BMCs 120, 130, 140, 150, and 160 of respective firmware images 122, 132, 142, 152, or 162 may be substantially similar. For clarity and brevity, boot operations will be described with respect to BMC 120 and firmware 122 of server 104. In an example, BMC 120 may attempt to boot firmware 122. However, one or more issues may arise with respect to firmware 122.

In certain examples, BMC firmware may be susceptible to corruption, such as failure of the memory location storing the BMC firmware. In an example, an error condition may arise where all BMC bootable partitions may be rendered un-bootable, such that the BMC may become completely unresponsive. In previous information handling systems, an individual associated with the information handling system would need to physically travel to the information handling system to replace the BMC firmware or the hardware. BMCs 120, 130, 140, 150, and 160 and ECs 114 and 116 may improve information handling system 200 may enabling verified good firmware to be transferred from one BMC to another, such as from BMC 130 to BMC 120, and the transferred firmware may replace the bad firmware within BMC 120 as will be described herein. In this example, information handling system 100 may be improved by decreasing amount of time to replace bad firmware within BMC 120, which in turn may increase the operational time of the information handling system.

In an example, if BMC 120 detects a boot failure of firmware 122, the BMC may provide a firmware request 170 to enclosure controller 114. Firmware request may be any suitable communication between BMC 120 and enclosure controller 114 to request a correct firmware image that is substantially similar to firmware 122. In an example, firmware request 170 may be a virtual local area network (VLAN) signal, which may be a secure communication only accessible by BMC 120 and enclosure controller 114. In certain examples, BMCs 130, 140, 150, and 160 may provide substantially similar firmware requests in response to a boot failure of the respective firmware image. For example, in response to a boot failure of firmware 132, BMC 130 may provide a firmware request 172 to enclosure controller 114. In response to a boot failure of firmware 142, BMC 140 may provide a firmware request 174 to enclosure controller 114. In response to a boot failure of firmware 152, BMC 150 may provide a firmware request 176 to enclosure controller 114. In response to a boot failure of firmware 162, BMC 160 may provide a firmware request 178 to enclosure controller 114. In certain examples, each of firmware requests 172, 174, 176, and 178 may be a secure VLAN communication between the respective BMC and enclosure controller 114. Firmware recovery will be described in greater detail with respect to FIG. 2.

Figure 2:
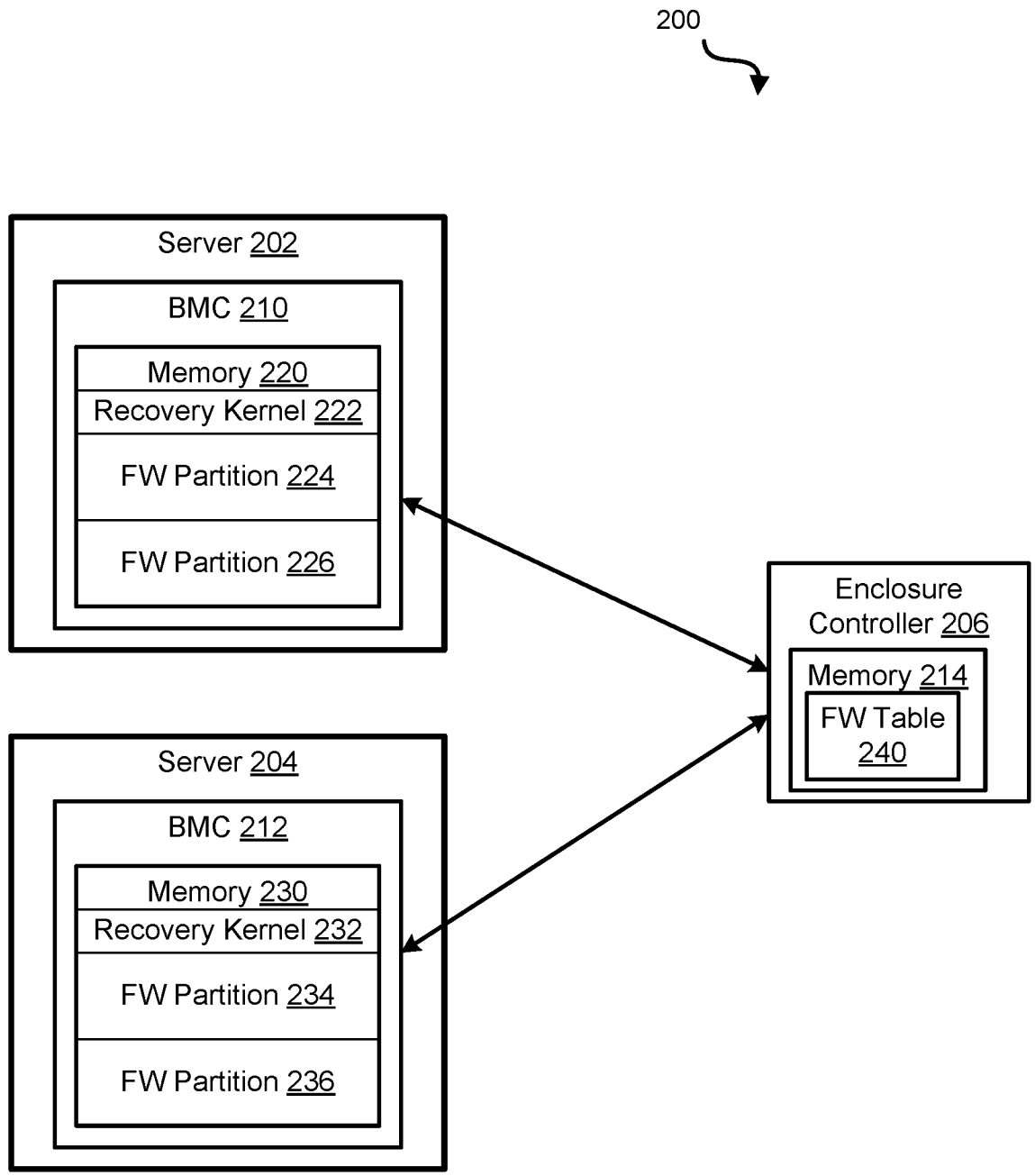
FIG. 2 is a diagram of a portion of the information handling system according to at least one embodiment of the present disclosure.

FIG. 2 illustrates a portion of an information handling system 200 according to at least one embodiment of the present disclosure. In an example, information handling system 200 may be substantially similar to information handling system 100 of FIG. 1. Information handling system 200 includes servers 202 and 204, and an enclosure controller 206. Server 202 includes a BMC 210, server 204 includes a BMC 212, and enclosure controller 206 includes a memory 214. In an example, memories 220 and 230 may be any suitable type of memory including, but not limited to, an embedded MultiMediaCard (eMMC) memory. Memory 220 may be divided into multiple partitions including, but not limited to, a portion to store a recovery kernel 222, a firmware partition 224, and a firmware partition 226. In an example, firmware partition 224 may store a main firmware image and firmware partition 226 may store a backup firmware image. Memory 230 may be divided into multiple partitions including, but not limited to, a portion to store a recovery kernel 232, a firmware partition 234, and a firmware partition 236. In an example, firmware partition 234 may store a main firmware image and firmware partition 236 may store a backup firmware image. Enclosure controller 206 may store a firmware table 240 in memory 214. In certain examples, information handling system 200 may include any suitable number of servers. For clarity and brevity, the operations of firmware recovery will be described with respect to servers 202 and 204.

In an example, BMC 210 may execute a bootloader, which in turn may attempt to boot a firmware image in firmware partition 224. In response, BMC 210 may determine whether a failure occurred during the boot of the firmware image. If a failure has been detected, BMC may attempt to boot the firmware image in partition 224 any suitable number of times, such as another two boot attempts. In response to a failure of the boot of the firmware a predetermined number of times, BMC 210 may attempt to boot a backup firmware image in firmware partition 226. If a failure has been detected, BMC 210 may attempt to boot the backup firmware image in partition 226 any suitable number of times, such as another two boot attempts. In response to a failure of the boot of the backup firmware a predetermined number of times, BMC 210 perform one or more suitable operations to receive a correct firmware image.

In an example, in response to boot failures being detected for both the main firmware image and the backup firmware image, BMC 210 may determine whether a memory device, such as a universal serial bus, storing a recovery firmware image is plugged into server 202. If no memory device with a recovery firmware image is connected to server 202, BMC 210 may determine whether a prefixed hardcoded trivial file transfer protocol (TFTP) server address is stored with a memory of BMC 210. In an example, the TFTP address may be a server address from which BMC 210 may accept a flash-able firmware image. In response to BMC 210 determining that access to a recovery firmware image is not available from a memory device plugged into server 202 nor from a TFPT address, BMC 210 may execute recovery kernel 222, which in turn may cause the BMC to run a recovery kernel. BMC 210 may also store or log the failure of the firmware image to indicate a recovery firmware image may be flashed into partition 224 and/or partition 226.

During the recovery kernel mode, BMC 210 may perform one or more suitable operations to provide a firmware request to enclosure controller 206. In an example, recovery kernel 222 may include any suitable data to enable the BMC to receive a firmware image from another BMC 212 in information handling system 200. For example, recovery kernel 222 may include a minimum infrastructure to enable BMC 210 to initiate communication with enclosure controller 206. In an example, the minimum infrastructure for recovery kernel 222 may include any suitable data including, but not limited to, remote procedure call (RPC) communication libraries, openssl, and public keys.

In this example, BMC 210 may utilize the recovery kernel 222 to generate a firmware request via the VLAN communication. The VLAN communication interface is not available or visible by components outside of BMC 210 and enclosure controller 206, such that the firmware request may be private and secure. The firmware request may be substantially similar to firmware request 170 of FIG. 1. In an example, the firmware request may include information associated with BMC 210, such as model information, firmware information, chassis slot information, or the like. The firmware request may also identify the specific features, if any, that are supported by the firmware in partition 224.

In response to receiving the firmware request, enclosure controller 206 may perform one or more suitable operations to determine and retrieve a firmware image that closely matches the firmware image in partitions 224 and 226. For example, enclosure controller 206 may query each BMC in information handling system 200, such as BMC 212 shown in FIG. 2. In an example, information handling system 200 may include any suitable number of BMCs, such as BMCs 120, 130, 140, 150, and 160 in FIG. 1, and enclosure controller 206 may provide a firmware query to each of the BMCs. In an example, enclosure controller 206 may provide each of the firmware queries along a different VLAN communication path. In response to the firmware query, BMC 212 may provide enclosure controller 206 with information associated with firmware in partition 234 and backup firmware in partition 236.

In an example, enclosure controller 206 may provide the firmware query to the BMCs in any suitable manner including, but not limited to, a broadcast signal to all of the BMCs at substantially the same time, and a signal provided to the BMCs on one-by-one basis. Enclosure controller 206 may receive response from the firmware queries, and each of the responses may indicate the features supported by the firmware, a version number of the firmware, or the like. In an example, a particular BMC, such as BMC 212, may provide available firmware images, such as the firmware image in partition 234 and the backup firmware image in partition 236, to enclosure controller 206.

Enclosure controller 206 may compare the firmware image associated with a functioning/good BMC, such as BMC 212, to the features of firmware image in BMC 210. For example, enclosure controller 206 may compare the features for a firmware image from BMC 212 to the features for firmware image of BMC 210. In an example, enclosure controller 206 may compare the features of the different firmware images on a feature-by-feature basis. In certain examples, any feature supported by the firmware image of BMC 210 must be supported by the firmware image to replace the failed firmware image. However, if the failed firmware image of BMC 210 does not have any features enabled, enclosure controller 206 may utilize any suitable criteria to select the replacement firmware image including, but not limited to, a latest version of a firmware image. In an example, enclosure controller 206 may select the first firmware image determined to support all of the features supported by firmware image of BMC 210.

In an example, enclosure controller 206 may maintain firmware table 240 to track the features and versions of all firmware images located within information handling system 200. Enclosure controller 206 may update firmware table 240 in any suitable manner. For example, when a new server is connected within information handling system 200, enclosure controller 206 may receive the features and current version for the firmware image within the BMC of the new server. In response to receiving the features and current version for the firmware image, enclosure controller 206 may store the features and versions for the firmware image in firmware table 240. In an example, any updates to features and/or versions of firmware images within a BMC, such as BMC 210 or BMC 212, may be provided to enclosure controller 206, which in turn may store the updates in firmware table 240. In certain examples, enclosure controller 206 may utilize firmware table 240 to determine the replacement firmware image for a failed BMC, such as BMC 210. For example, enclosure controller 206 may scan the data in firmware table 240, determine a firmware image that supports the features of the failed firmware image, and set the determined firmware image as the replacement firmware image.

In response to enclosure controller 206 determining the replacement firmware image, such as the firmware image in partition 234 or partition 236 of BMC 212, the enclosure controller may perform one or more suitable operations to transfer or transfuse the replacement firmware image from BMC 212 to BMC 210. For example, enclosure controller 206 may establish a secure connection among BMC 210 to the enclosure controller and BMC 212. In an example, the secure communication may be any suitable communication, such as a secure VLAN communication. In response to the secure communication being established, BMC 212 may begin to transmit the firmware image along with an associated signature from partition 234 or 236 to recovery kernel 222 of BMC 210 via enclosure controller 206. In an example, enclosure controller 206 may relay with packets of data from BMC 212 to BMC 210 without performing any verification or other operation.

In an example, recovery kernel 222 of BMC 210 may perform one or more suitable operations on the firmware data packets from BMC 212. For example, recovery kernel 222 may receive the incoming packets, construct a final firmware image, and flash the firmware image into a temporary memory location, such as memory 604 in FIG. 6. In certain examples, the temporary memory location may be in any suitable type of memory including, but not limited to, a random access memory (RAM), and a persistent storage location. In response to the complete replacement firmware image being flashed into the temporary memory location, recovery kernel 222 may verify the firmware image. For example, recovery kernel 222 may perform a cryptographic verification to ensure the authenticity of the firmware image.

Recovery kernel 222 may verify the replacement firmware image in any suitable manner. For example, recovery kernel 222 may verify the signature of the replacement firmware with a public key stored in the recovery kernel. In an example, a signature for the replacement firmware may be stored along with the firmware image in partition 234 and/or partition 236 within BMC 212. In certain example, recovery kernel 222 may verify the replacement firmware image as a whole complete firmware image based on the received signature.

In response to the replacement firmware image being verified, recovery kernel 222 may perform one or more operations to store the replacement firmware image in partitions 224 and 226. For example, recovery kernel 222 may unlock partitions 224 and 226 to enable the replacement firmware image to be written to these partitions of memory 220. Recovery kernel 222 may then write the blocks of the replacement firmware image to both partition 224 and partition 226. When the replacement firmware image has been written to partitions 224 and 226, the firmware image transaction or transfusion may be completed and a boot count for the partitions may be cleared.

Enclosure controller 206 may issue a reboot to BMC 210. During the reboot, BMC 210 may boot from the newly flashed firmware image in partition 224 and the BMC and server 202 may complete the boot operation. In an example, during the firmware recovery operations, recovery kernel 222 may generate logs. In certain examples, the logs may provide the individual with information about the automatic firmware recovery process.

In certain examples, BMC 210 may generate and provide a firmware request to enclosure controller 206 based on any suitable trigger including, but not limited to, a boot failure of firmware images on the BMC 210 as described above, and a firmware update initiated via a user of information handling system 200. In an example, the user may initiate the firmware update at anytime, which in turn may initiate BMC 210 sending the firmware request in situations other than when a failed firmware image is detected. For example, the user may initiate the firmware update to enable BMC 210 to receive a firmware transfusion from one of the other BMCs in information handling system 200, such as BMC 212. In response to the user initiated firmware update, BMC 210 may perform the operations described above to receive the correct firmware image from BMC 212.

Figure 3:
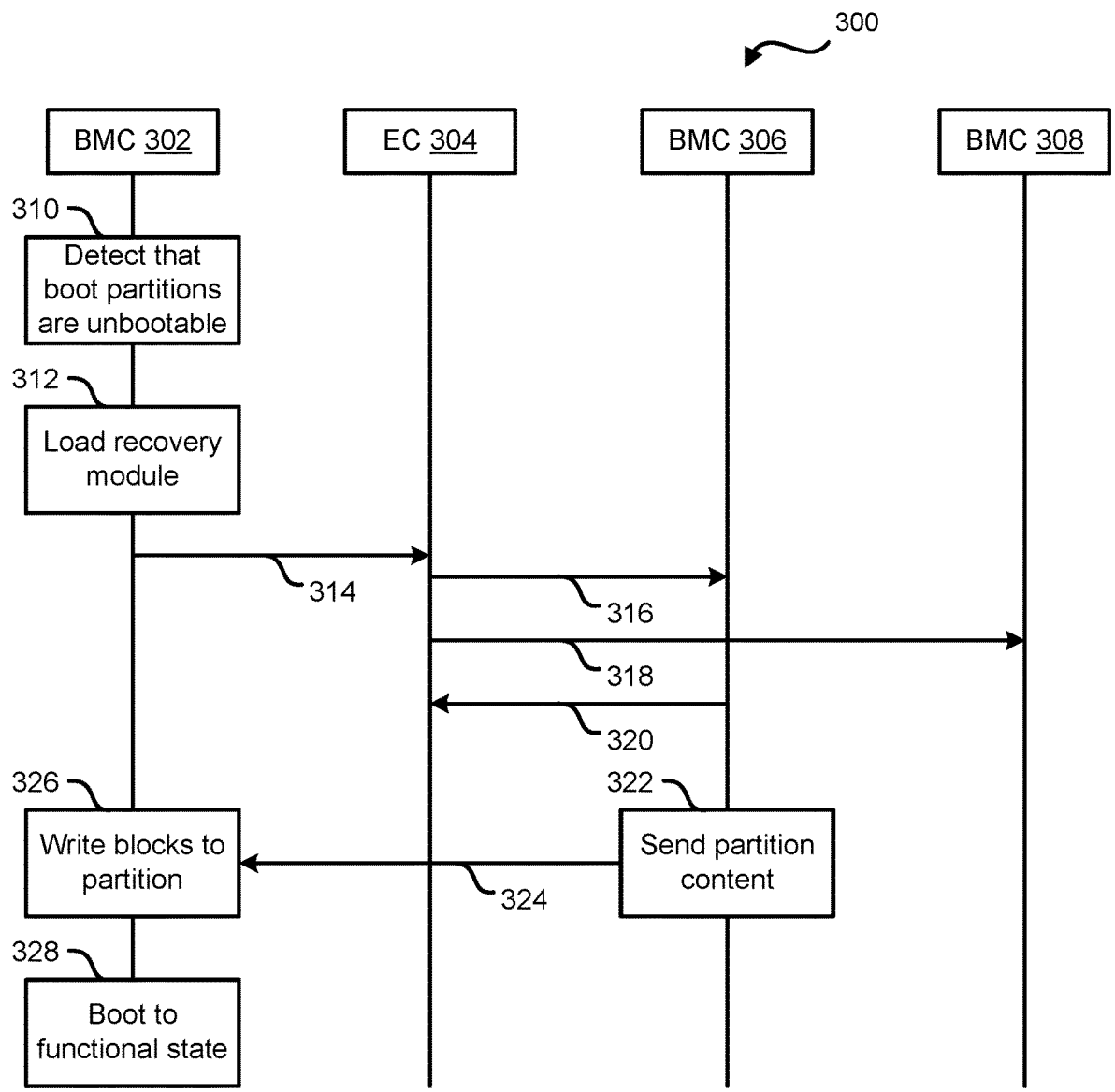
FIG. 3 is a diagram of a method for performing firmware recovery according to at least one embodiment of the present disclosure.

FIG. 3 shows a method 300 for recovering firmware for a bad BMC 302 according to at least one embodiment of the present disclosure, starting at block 310. It will be readily appreciated that not every method step set forth in this flow diagram is always necessary, and that certain steps of the methods may be combined, performed simultaneously, in a different order, or perhaps omitted, without varying from the scope of the disclosure. FIG. 3 may be employed in whole, or in part, BMC 302, an enclosure controller 304, and BMCs 306 and 308, or any other type of system, controller, device, module, processor, or any combination thereof, operable to employ all, or portions of, the method of FIG. 3.

At block 310, BMC 302 may detect that boot partitions within the BMC are unbootable. In an example, the boot partitions may be different portions of a memory within the BMC. In certain examples, one partition may store a primary firmware image for the BMC and another partition may store a backup firmware image for the BMC. The memory may be any suitable type of memory including, but not limited to, an eMMC memory.

At block 312, BMC 302 may load a recovery module. In an example, the recovery module may be loaded based on BMC 302 executing a recovery kernel within a partition of the memory. In certain examples, the recovery kernel may include any suitable data to enable BMC 302 to receive a firmware image from another BMC. For example, the recovery kernel may include a minimum infrastructure to enable BMC 302 to initiate communication with enclosure controller 304. In an example, the minimum infrastructure for the recovery kernel may include any suitable data including, but not limited to, communication libraries, openssl, and public keys. At operation 314, BMC 302 may utilize the recovery kernel to generate a firmware request, and provide the firmware request to enclosure controller 304 via a VLAN communication. The VLAN communication interface is not available or visible by components outside of BMC 302 and enclosure controller 304, such that the firmware request may be private and secure. In an example, the firmware request may also identify the specific features, if any, that are supported by the bad firmware image in the partitions of BMC 302.

At operation 316, enclosure controller 304 may provide a firmware query to BMC 306. In an example, the firmware query may be any suitable communication to request information associated with the current firmware image of BMC 306. At operation 318, enclosure controller 304 may provide a firmware query to BMC 308, to request information associated with the current firmware image of BMC 308. In an example, enclosure controller 304 may wait for a response from either BMC 306 or BMC 308. At operation 320, BMC 306 may provide a response indicating that a firmware image within the BMC substantially matches the bad firmware image in BMC 302. In an example, a substantial match may include, but is not limited to, the firmware image supporting the same features as the bad firmware image, and the firmware image being the same version as the bad firmware image.

In response to the firmware response, enclosure controller 304 may setup a secure communication between BMC 306 and BMC 302. At operation 322, BMC 306 may send data packets for the firmware image of a partition within the BMC. At operation 324, the data packets may be transferred through enclosure controller 304 to BMC 302 via the secure communication link. At operation 326, BMC 302 may write the received data packets for the good/replacement firmware image to a partition of the BMC. In an example, the writing of the replacement firmware image may be to overwrite the bad firmware image in the partition of BMC 302. At operation 328, BMC 302 may boot to a functional state based on the replacement firmware image written to the partition of the BMC.

Figure 4:
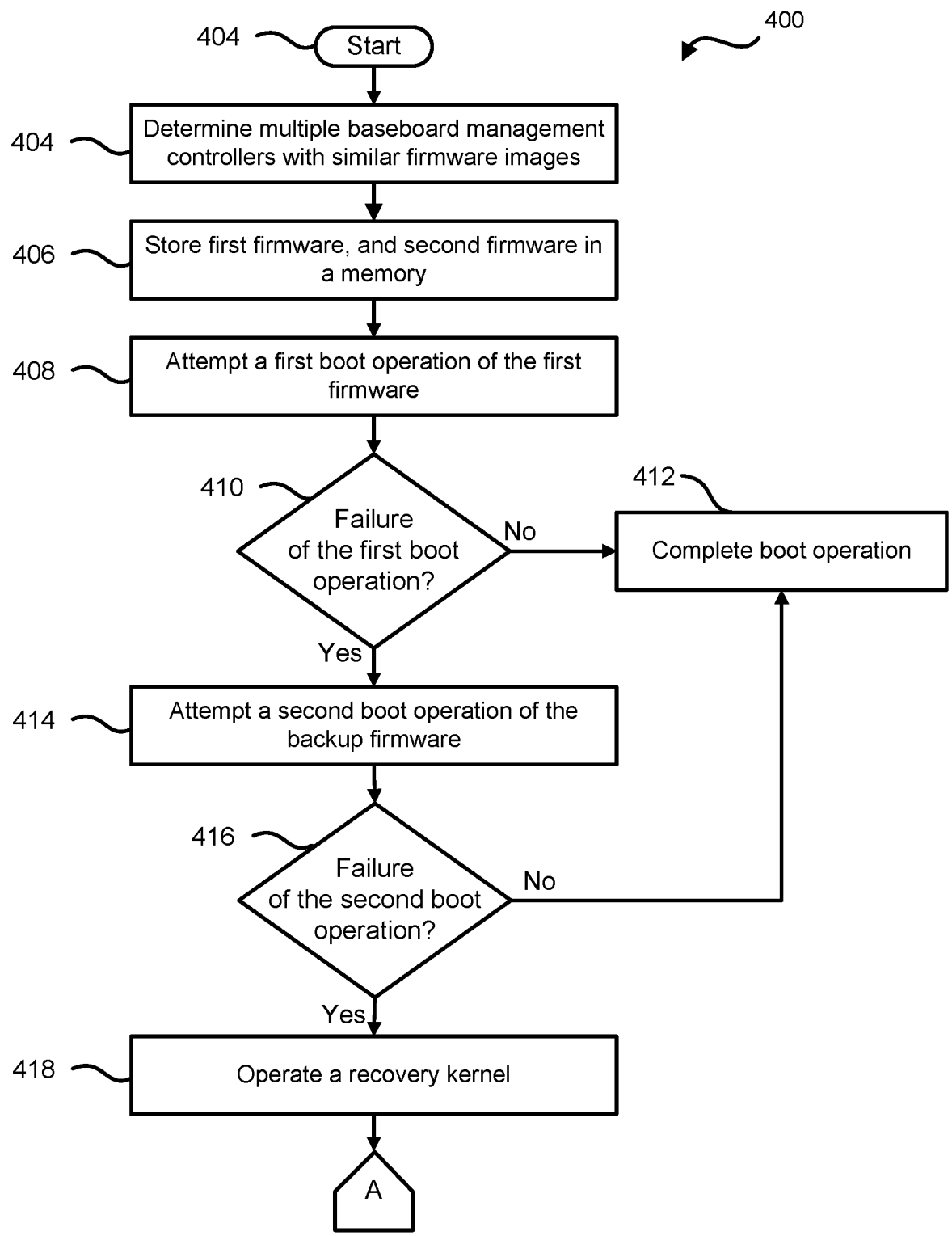
FIGS. 4 and 5 are a flow diagram of a method for performing firmware recovery according to at least one embodiment of the present disclosure.
Figure 5:
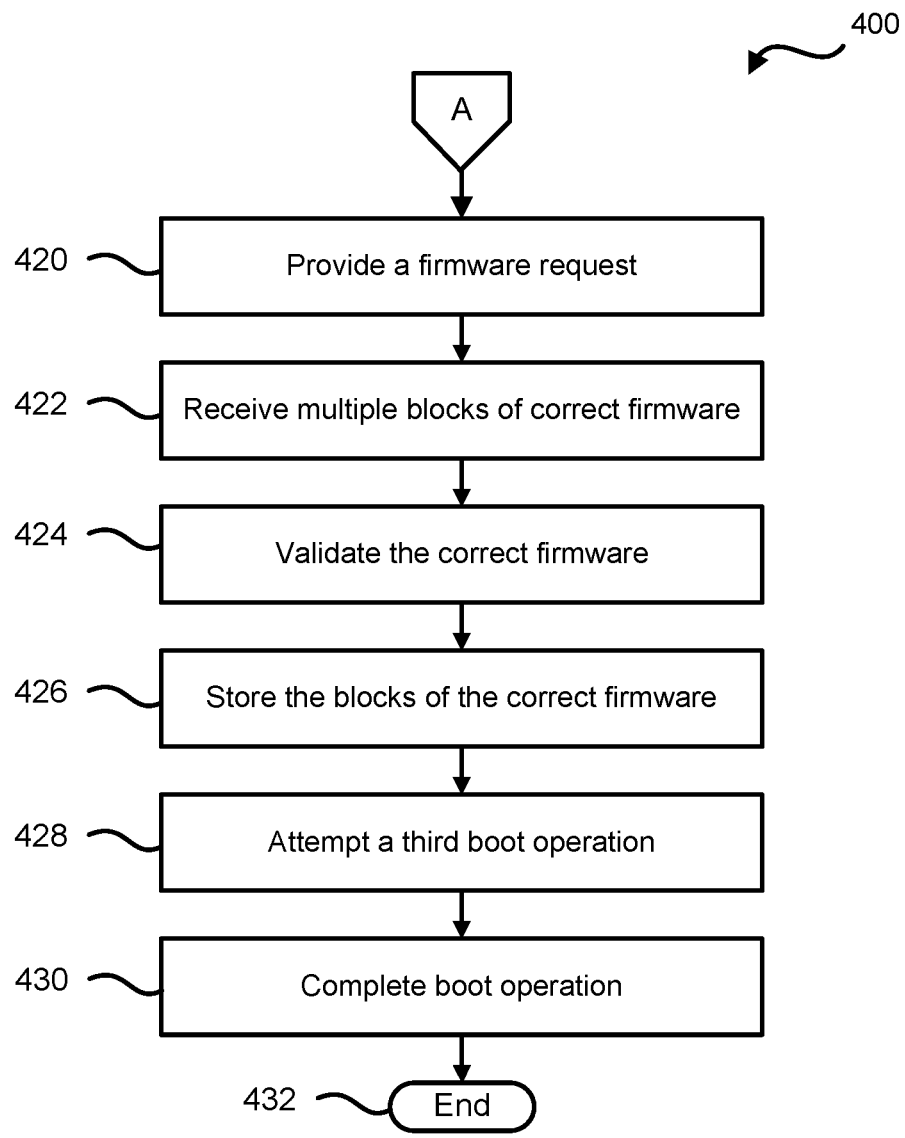

FIGS. 4 and 5 show a method 400 for recovering firmware of a bad baseboard management controller according to at least one embodiment of the present disclosure, starting at block 402. It will be readily appreciated that not every method step set forth in this flow diagram is always necessary, and that certain steps of the methods may be combined, performed simultaneously, in a different order, or perhaps omitted, without varying from the scope of the disclosure. FIG. 4 may be employed in whole, or in part, the components of information handling system 100 of FIG. 1, the components of information handling system 200 of FIG. 2, or any other type of system, controller, device, module, processor, or any combination thereof, operable to employ all, or portions of, the method of FIG. 4.

At block 404, multiple BMCs that include substantially similar firmware images are determined. In an example, an enclosure controller of an information handling system may communicate with the BMCs to determine features supported by the firmware images and versions of the firmware images. The enclosure controller may store this information in a firmware table. At block 406, a first firmware image is stored in a first boot partition of the memory, and a backup firmware image is stored in a second boot partition of the memory. In an example, the memory may be any suitable type of memory including, but not limited to, an eMMC memory.

At block 408, a first boot operation of the first firmware in the first boot partition is attempted. At block 410, a determination is made whether a failure of the first boot operation has been detected. If a failure is not detected, the boot operation is completed at block 412. If the failure is detected, a second boot operation of the backup firmware in the second boot partition is attempted at block 414.

At block 416, a determination is made whether a failure of the second boot operation has been detected. If a failure is not detected, the boot operation is completed at block 412. If the failure is detected, a recovery kernel is operated at block 414. In an example, the operation of the recovery kernel may place the BMC in a recovery mode to receive a new or replacement firmware image.

During the operation of the recovery kernel, a firmware request is provided at block 420. In an example, the firmware request may include information associated with the BMC, such as model information, firmware information, chassis slot information, or the like. The firmware request may also identify the specific features, if any, that are supported by the failed firmware image. At block 422, multiple blocks of a correct firmware image are received. In an example, the correct firmware image blocks may be received via a secure communication among a BMC with the correct firmware image, the enclosure controller, and the BMC with the bad firmware image. In certain examples, the BMC with the correct firmware image may be any suitable BMC including, but not limited to, one of the BMCs that include the substantially similar firmware images.

At block 424, the received correct firmware image is validated on a bit-by-bit basis. At block 426, the validate correct firmware image is stored in both the first boot partition and the backup boot partition. At block 428, a third boot operation of the correct firmware is attempted. At block 430, the boot operation is completed, and the method ends at block 432.

Figure 6:
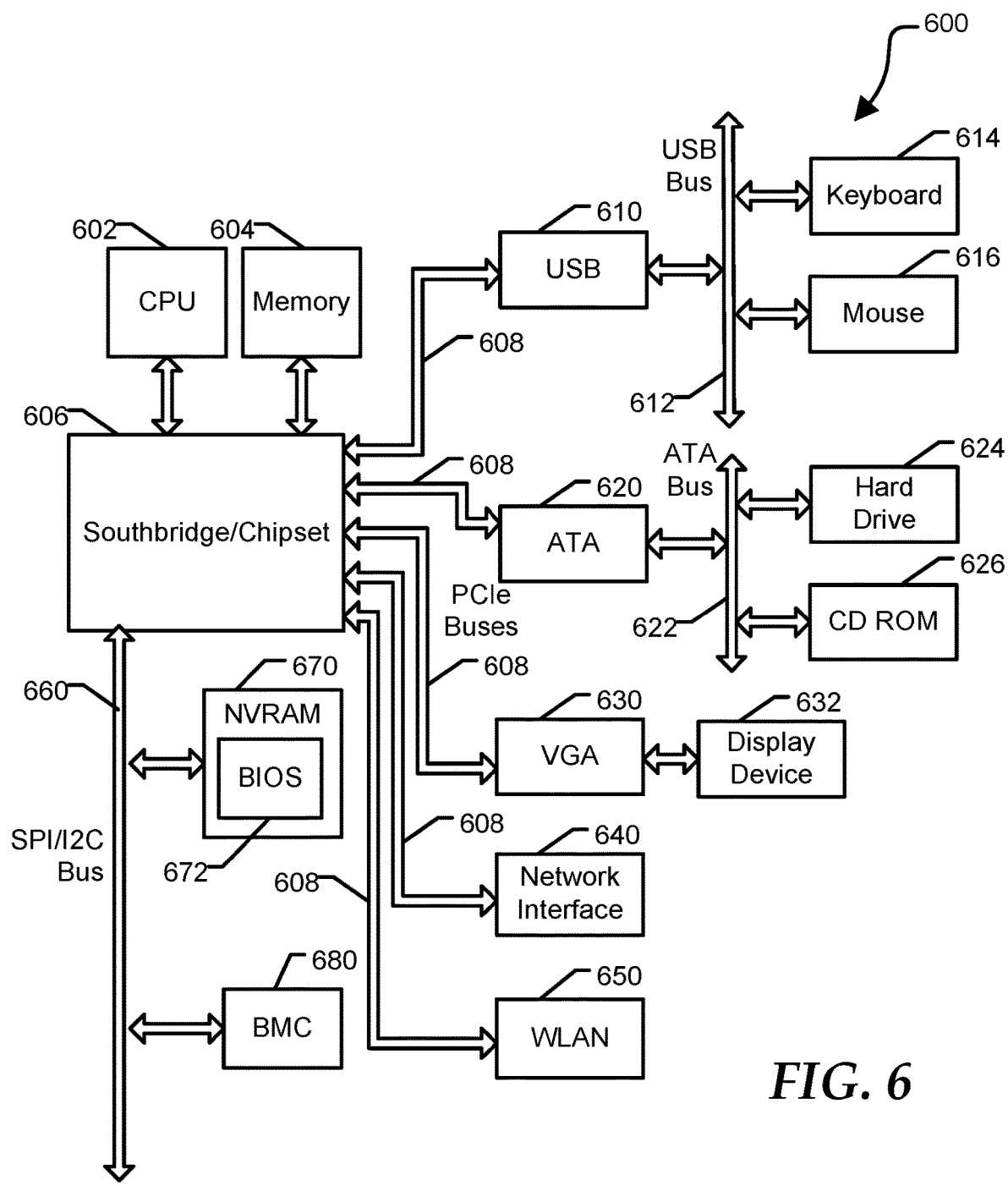
FIG. 6 is a block diagram of a general information handling system according to an embodiment of the present disclosure.

FIG. 6 illustrates a general information handling system 600. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a PDA, a consumer electronic device, a network server or storage device, a switch router or other network communication device, or any other suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various other I/O devices, such as a keyboard, a mouse, and a video display. The information handling system may also include one or more busses operable to transmit communications between the various hardware components.

Information handling system 600 including a processor 602, a memory 604, a southbridge/chipset 606, one or more PCIe buses 608, a universal serial bus (USB) controller 610, a USB 612, a keyboard device controller 614, a mouse device controller 616, a configuration an ATA bus controller 620, an ATA bus 622, a hard drive device controller 624, a compact disk read only memory (CD ROM) device controller 626, a video graphics array (VGA) device controller 630, a network interface controller (NIC) 640, a wireless local area network (WLAN) controller 650, a serial peripheral interface (SPI) bus 660, a NVRAM 670 for storing BIOS 672, and a baseboard management controller (BMC) 680. In an example, chipset 606 may be directly connected to an individual end point via a PCIe root port within the chipset and a point-to-point topology as shown in FIG. 6. BMC 680 can be referred to as a service processor or embedded controller (EC). Capabilities and functions provided by BMC 680 can vary considerably based on the type of information handling system. For example, the term baseboard management system is often used to describe an embedded processor included at a server, while an embedded controller is more likely to be found in a consumer-level device. As disclosed herein, BMC 680 represents a processing device different from CPU 602, which provides various management functions for information handling system 600. For example, an embedded controller may be responsible for power management, cooling management, and the like. An embedded controller included at a data storage system can be referred to as a storage enclosure processor.

System 600 can include additional processors that are configured to provide localized or specific control functions, such as a battery management controller. Bus 660 can include one or more busses, including a SPI bus, an I2C bus, a system management bus (SMBUS), a power management bus (PMBUS), and the like. BMC 680 can be configured to provide out-of-band access to devices at information handling system 600. As used herein, out-of-band access herein refers to operations performed prior to execution of BIOS 672 by processor 602 to initialize operation of system 600.

BIOS 672 can be referred to as a firmware image, and the term BIOS is herein used interchangeably with the term firmware image, or simply firmware. BIOS 672 includes instructions executable by CPU 602 to initialize and test the hardware components of system 600, and to load a boot loader or an operating system (OS) from a mass storage device. BIOS 672 additionally provides an abstraction layer for the hardware, such as a consistent way for application programs and operating systems to interact with the keyboard, display, and other input/output devices. When power is first applied to information handling system 600, the system begins a sequence of initialization procedures. During the initialization sequence, also referred to as a boot sequence, components of system 600 are configured and enabled for operation, and device drivers can be installed. Device drivers provide an interface through which other components of the system 600 can communicate with a corresponding device.

Information handling system 600 can include additional components and additional busses, not shown for clarity. For example, system 600 can include multiple processor cores, audio devices, and the like. While a particular arrangement of bus technologies and interconnections is illustrated for the purpose of example, one of skill will appreciate that the techniques disclosed herein are applicable to other system architectures. System 600 can include multiple CPUs and redundant bus controllers. One or more components can be integrated together. For example, portions of southbridge/chipset 606 can be integrated within CPU 602. Additional components of information handling system 600 can include one or more storage devices that can store machine-executable code, one or more communications ports for communicating with external devices, and various input and output (I/O) devices, such as a keyboard, a mouse, and a video display. An example of information handling system 600 includes a multi-tenant chassis system where groups of tenants (users) share a common chassis, and each of the tenants has a unique set of resources assigned to them. The resources can include blade servers of the chassis, input/output (I/O) modules, Peripheral Component Interconnect-Express (PCIe) cards, storage controllers, and the like.

In an example, information handling system 600 may be any suitable device including, but not limited to, information handling system 100 of FIG. 1. Information handling system 600 can include a set of instructions that can be executed to cause the information handling system to perform any one or more of the methods or computer based functions disclosed herein. The information handling system 600 may operate as a standalone device or may be connected to other computer systems or peripheral devices, such as by a network.

In a networked deployment, the information handling system 600 may operate in the capacity of a server or as a client user computer in a server-client user network environment, or as a peer computer system in a peer-to-peer (or distributed) network environment. The information handling system 600 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 600 can be implemented using electronic devices that provide voice, video or data communication. Further, while a single information handling system 600 is illustrated, the term "system" shall also be taken to include any collection of systems or sub-systems that individually or jointly execute a set, or multiple sets, of instructions to perform one or more computer functions.

The information handling system 600 can include a disk drive unit and may include a computer-readable medium, not shown in FIG. 6, in which one or more sets of instructions, such as software, can be embedded. Further, the instructions may embody one or more of the methods or logic as described herein. In a particular embodiment, the instructions may reside completely, or at least partially, within system memory 604 or another memory included at system 600, and/or within the processor 602 during execution by the information handling system 600. The system memory 604 and the processor 602 also may include computer-readable media.

While the computer-readable medium 636 of information handling system 600 is shown in FIG. 6 to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to store information received via carrier wave signals such as a signal communicated over a transmission medium. Furthermore, a computer readable medium can store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

In the embodiments described herein, an information handling system includes any instrumentality or aggregate of instrumentalities operable to compute, classify, process, transmit, receive, retrieve, originate, switch, store, display, manifest, detect, record, reproduce, handle, or use any form of information, intelligence, or data for business, scientific, control, entertainment, or other purposes. For example, an information handling system can be a personal computer, a consumer electronic device, a network server or storage device, a switch router, wireless router, or other network communication device, a network connected device (cellular telephone, tablet device, etc.), or any other suitable device, and can vary in size, shape, performance, price, and functionality.

The information handling system can include memory (volatile (e.g. random-access memory, etc.), nonvolatile (read-only memory, flash memory etc.) or any combination thereof), one or more processing resources, such as a central processing unit (CPU), a graphics processing unit (GPU), hardware or software control logic, or any combination thereof. Additional components of the information handling system can include one or more storage devices, one or more communications ports for communicating with external devices, as well as, various input and output (I/O) devices, such as a keyboard, a mouse, a video/graphic display, or any combination thereof. The information handling system can also include one or more buses operable to transmit communications between the various hardware components. Portions of an information handling system may themselves be considered information handling systems.

When referred to as a "device," a "module," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device).

The device or module can include software, including firmware embedded at a device, such as a Pentium class or PowerPC™ brand processor, or other such device, or software capable of operating a relevant environment of the information handling system. The device or module can also include a combination of the foregoing examples of hardware or software. Note that an information handling system can include an integrated circuit or a board-level product having portions thereof that can also be any combination of hardware and software.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. An information handling system comprising: a memory including a recovery partition including a recovery kernel, a first boot partition including first firmware, and a second boot partition including backup firmware; and a baseboard management controller to communicate with the memory, the baseboard management controller to: operate a recovery kernel; and during the operation of the recovery kernel: provide a firmware request to an enclosure controller; receive a plurality of blocks of correct firmware from a functioning baseboard management controller; store the blocks of the correct firmware in the first boot partition; attempt a boot operation of the correct firmware; and complete the boot operation, wherein the enclosure controller further to: receive the firmware request from first baseboard management controller; determine a closest matching firmware image of remaining baseboard management controllers; and provide the closest matching firmware image to the first baseboard management controller.

2. An information handling system comprising:
an enclosure controller to determine a plurality of baseboard management controllers that include substantially similar firmware images; and
a server to communicate with the enclosure controller, the server including:
a memory including a recovery partition including a recovery kernel, a first boot partition including first firmware, and a second boot partition including backup firmware; and
a first baseboard management controller to communicate with the memory, the first baseboard management controller to:
attempt a first boot operation of the first firmware in the first boot partition;
detect a failure of the first boot operation;
in response to the failure of the first boot operation, attempt a second boot operation of the backup firmware in the second boot partition;
detect a failure of the second boot operation;
in response to the failure of the second boot operation, operate a recovery kernel; and
during the operation of the recovery kernel:
provide a firmware request to the enclosure controller;
receive a plurality of blocks of correct firmware from the enclosure controller, wherein the blocks of correct firmware is from one of the baseboard management controllers that include the substantially similar firmware images;
store the blocks of the correct firmware in the first boot partition;
attempt a third boot operation of the correct firmware; and
complete the third boot operation,
wherein the enclosure controller further to:
receive the firmware request from the first baseboard management controller;
determine a closest matching firmware image of remaining baseboard management controllers; and
provide the closest matching firmware image to the first baseboard management controller.

3. The information handling system of claim 1, wherein prior to the firmware request being provided, the baseboard management controller further to:
determine whether a memory device including update firmware is located within the information handling system; and
in response to the memory device with the update firmware not being located within the information handling system, provide the firmware request.

4. The information handling system of claim 1, wherein prior to the firmware request being provided, the baseboard management controller further to:
determine whether firmware is available on a hardcoded trivial file transfer protocol server; and
in response to the firmware on the hardcoded trivial file transfer protocol server not being available, provide the firmware request.

5. The information handling system of claim 1, wherein the baseboard management controller communicates with the enclosure controller via a virtual local area network communication channel.

6. The information handling system of claim 2, wherein prior to the blocks of the correct firmware being stored in the first boot partition, the baseboard management controller further to: validate the received blocks of the correct firmware based on a signature of the correct firmware.

7. The information handling system of claim 1, wherein prior to the blocks of the correct firmware being stored in the first boot partition, the baseboard management controller further to: validate the received blocks of the correct firmware based on a signature of the correct firmware.

8. The information handling system of claim 6, wherein prior to the firmware request being provided, the first baseboard management controller further to:
determine whether a memory device including update firmware is located within the information handling system; and
in response to the memory device with the update firmware not being located within the information handling system, provide the firmware request.

9. The information handling system of claim 6, wherein prior to the firmware request being provided, the first baseboard management controller further to:
determine whether firmware is available on a hardcoded trivial file transfer protocol server; and
in response to the firmware on the hardcoded trivial file transfer protocol server not being available, provide the firmware request.

10. The information handling system of claim 6, wherein the enclosure controller further to:
maintain a table of current firmware versions in each of the baseboard management controllers.

11. The information handling system of claim 6, wherein the determination of the closest matching firmware image includes the enclosure controller further to:
determine one or more firmware images that support features supported in first firmware of the first baseboard management controller; and
determine a version number for each of the firmware images that support the features supported in the first firmware.

12. The information handling system of claim 6, wherein the first baseboard management controller communicates with the enclosure controller via a virtual local area network communication channel.

13. A method comprising:
determining, by an enclosure controller of an information handling system, a plurality of baseboard management controllers that include substantially similar firmware images;
operating a recovery kernel; and
during the operation of the recovery kernel:
providing a firmware request to the enclosure controller;
receiving, by the enclosure controller, the firmware request from a first baseboard management controller;
determining a closest matching firmware image of remaining baseboard management controllers;
providing the closest matching firmware image to the first baseboard management controller;
receiving a plurality of blocks of correct firmware from the enclosure controller, wherein the blocks of correct firmware are from one of the baseboard management controllers that include the substantially similar firmware images;

storing the blocks of the correct firmware in first boot partition of a memory of the information handling system;
attempting a boot operation of the correct firmware; and
completing the boot operation.

14. The method of claim 13, wherein prior to the blocks of the correct firmware being stored in the first boot partition, the method further comprises:
validating the received blocks of the correct firmware based on a signature of the correct firmware.

15. The method of claim 13, wherein prior to the firmware request being provided, the method further comprises:
determining whether a memory device including update firmware is located within the information handling system; and
in response to the memory device with the update firmware not being located within the information handling system, providing the firmware request.

16. The method of claim 13, wherein prior to the firmware request being provided, the method further comprises:
determining whether firmware is available on a hardcoded trivial file transfer protocol server; and
in response to the firmware on the hardcoded trivial file transfer protocol server not being available, providing the firmware request.

17. The method of claim 13, further comprising:
maintaining, by the enclosure controller, a table of current firmware versions in each of the baseboard management controllers.

18. The method of claim 13, wherein the determining of the closest matching firmware image, the method further includes:
determining one or more firmware images that support features supported in first firmware of the first baseboard management controller; and
determining a version number for each of the firmware images that support the features supported in the first firmware.

* * * * *